US007266130B2

(12) United States Patent
Lee et al.

(10) Patent No.: US 7,266,130 B2
(45) Date of Patent: Sep. 4, 2007

(54) APPARATUS AND METHOD FOR MULTIPLEXING MULTIPLE END-TO-END TRANSMISSION LINKS IN A COMMUNICATION SYSTEM

(75) Inventors: Sung-Won Lee, Songnam-shi (KR); Young-Ky Kim, Seoul (KR); Dong-Soo Park, Seoul (KR); Dong-Jun Lee, Songnam-shi (KR); Sang-Soo Kim, Songnam-shi (KR); Jin-Sung Cho, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 940 days.

(21) Appl. No.: 10/034,234

(22) Filed: Dec. 28, 2001

(65) Prior Publication Data

US 2003/0123479 A1    Jul. 3, 2003

(51) Int. Cl.
*H04Q 7/30* (2006.01)
*H04J 3/16* (2006.01)

(52) U.S. Cl. .................. 370/466; 370/395.1; 370/392; 370/401; 375/140

(58) Field of Classification Search ............. 370/310.1, 370/338, 394, 473–474, 310–336, 395.1, 370/392, 400–404, 465–467
See application file for complete search history.

(56) References Cited

U.S. PATENT DOCUMENTS

| 5,337,313 | A | * | 8/1994 | Buchholz et al. | ............ 370/394 |
| 5,608,733 | A | * | 3/1997 | Vallee et al. | ................ 370/394 |
| 5,648,970 | A | * | 7/1997 | Kapoor | ....................... 370/394 |
| 6,134,246 | A | * | 10/2000 | Cai et al. | .................... 370/474 |
| 6,490,296 | B2 | * | 12/2002 | Shenoi et al. | ............... 370/469 |
| 6,894,977 | B1 | * | 5/2005 | Vallee | ..................... 370/236.2 |

* cited by examiner

*Primary Examiner*—Afsar Qureshi
(74) *Attorney, Agent, or Firm*—The Farrell Law Firm (57) ABSTRACT

Disclosed is a method for transmitting a packet through a plurality of physical links in a mobile communication system in which a base station controller (BSC) is connected to a base transceiver system (BTS) through the plurality of physical links. The method includes the steps of determining whether a specific service uses at least two links, when there is transmission data for the service; setting up a sequence number in the transmission packet, when the service uses at least two links; and transmitting the packet through a link selected from the two links. The determining step is performed when there is transmission data for the service, and the setting step is performed when the service uses at least two links.

23 Claims, 8 Drawing Sheets

APPARATUS AND METHOD FOR MULTIPLEXING MULTIPLE END-TO-END TRANSMISSION LINKS IN A COMMUNICATION SYSTEM

BACKGROUND OF THE INVENTION

1. Field of the Invention

The present invention relates generally to an apparatus and method for multiplexing multiple end-to-end transmission links in a communication system, and in particular, to an apparatus and method for multiplexing multiple transmission links between a base station controller and a base transceiver system in a mobile communication system.

2. Description of the Related Art

In general, a mobile communication system includes a base station controller (BSC), a base transceiver system (BTS) and a mobile terminal. For communication, the base station controller is connected by wire to a mobile switching center (MSC) and the base transceiver system is wirelessly connected to the mobile terminal. Such a mobile communication system has typically provided a mobile subscriber with a voice service only. Recently, however, the mobile communication system tends to support not only the voice servile but also a high-speed data service.

Conventionally, a connection between the base station controller and the base transceiver system is uniquely independently made for each user. Further, a single link is set up between the base station controller and the base transceiver system, and the link is shared by a plurality of users. Meanwhile, the base station controller exchanges RLP (Radio Link Protocol) frames with the base transceiver system through a proprietary flow-control process, which is not a standard scheme and is unique for each manufacturer. In addition, the base station controller and the base transceiver system include a plurality of buffers in order to control priorities of packets exchanged between them during the flow-control process. An actual data exchange is made by a transport layer of a lower layer.

For the packet exchange, an ATM (Asynchronous Transfer Mode) scheme and an IP (Internet Protocol) can be used. The current mobile communication system typically uses the ATM scheme, a kind of an end-to-end connection scheme in which a physical link is associated with a virtual circuit (VC) on a one-to-one basis.

Describing a transmission procedure by a transmitter in the case where the physical link is associated with the virtual circuit on a one-to-one basis, in a transmission mode, a packet is transmitted through a transmission link established for its service. A receiver then receives the packet through the transmission link established for the service and provides the received packet to an upper layer.

Of the conventional mobile communication standards, the cdmaOne standard supports a service of 9.6/1.4 Kbps or 64 Kbps while the CDMA2000 1X standard supports a service of 153.6 Kbps, in a radio environment. In general, the base station controller communicates with the base transceiver system through an E1/T1 link. In this case, there is no difficulty in supporting the above low (9.6 kbps/14.4 kbps) and medium (153.6 kbps) data rate services because the E1/T1 link supports a rate of 2 Mbps and 1.5 Mbps. However, a mobile communication system proposed for high-speed data transmission (e.g., CDMA2000 1xEV-DO) provides a service of a maximum of 2.4 Mbps in the radio environment. That is, the future mobile communication system shall provide a rate higher than that of the E1 or T1 link in the radio environment. However, the conventional mobile communication system cannot support the high-speed data service, since the base station controller and the base transceiver system support a single connection link for each service, as stated above.

SUMMARY OF THE INVENTION

It is, therefore, an object of the present invention to provide an apparatus and method for multiplexing multiple end-to-end transmission links in a communication system.

It is another object of the present invention to provide an apparatus and method for multiplexing multiple end-to-end transmission links between a base station controller and a base transceiver system in a mobile communication system.

According to one aspect of the present invention, there is provided a method for transmitting a packet through a plurality of physical links in a mobile communication system in which a base station controller (BSC) is connected to a base transceiver system (BTS) through the plurality of physical links. The method comprises determining whether a specific service uses at least two links, when there is transmission data for the service; setting up a sequence number in the transmission packet, when the service uses at least two links; and transmitting the packet through a link selected from the two links.

According to another aspect of the present invention, there is provided a method for receiving a packet through a plurality of links in a mobile communication system in which a base station controller (BSC) is connected to a base transceiver system (BTS) through the plurality of links. The method comprises determining whether a packet is received through the plurality of links; upon receiving a packet, analyzing a sequence number of the received packet to determine whether the received packet is a to-be-received packet; storing the received packet in a reception buffer and activating a timer, when the received message is not a to-be-received packet; upon receiving the to-be-recieved packet before expiration of the timer, inactivating the timer and processing the received to-be-received packet along with the packet stored in the reception buffer; and abandoning reception of the to-be-received packet and processing the packet stored in the reception buffer, upon failure to receive the to-be-received packet before expiration of the timer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the term "virtual circuit (VC)" represents a virtual channel of an ATM scheme. In implementation, the virtual circuit may be mapped to the virtual channel of the ATM scheme or a session of IP (Internet Protocol).

Figure 1:
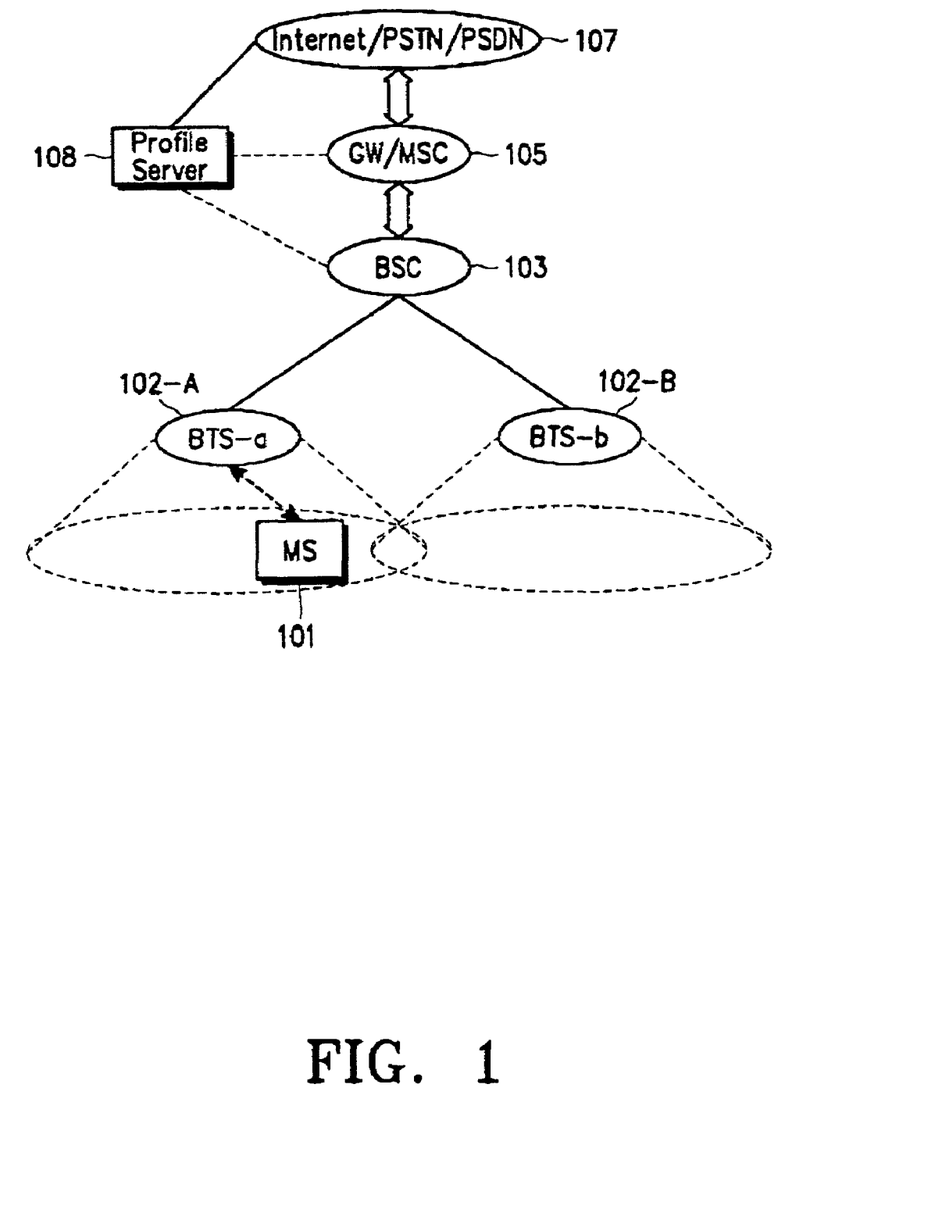
FIG. 1 illustrates a network configuration of a mobile communication system to which the present invention is applied.

FIG. 1 illustrates a network configuration of a mobile communication system to which the present invention is applied. The mobile communication system provides a mobile subscriber with a packet service as well as a voice service. The illustrated configuration merely shows a typical configuration of the mobile communication system, and the terms of the respective elements can be changed according to the various systems (e.g., IS-2000, W-CDMA, UMTS, CDMA2000 1xEV-DO, GPRS and 1xEV-DV).

Referring to FIG. 1, a mobile station (MS) 101 refers to a mobile communication terminal. The mobile station 101 can be either an existing voice-based legacy terminal not supporting IP or a future IP terminal supporting the IP. Base transceiver systems (BTSs) 102-A and 102-B (alternatively referred to as base transceiver system 102) are equipment for managing radio resources and actually exchanging information with the mobile station 101 through a radio link. A base station controller (BSC) 103, a device for controlling the BTSs, supports a signaling protocol such as call setup and call release. A GW/MSC (Gateway/Mobile Switching Center) 105, a device for connecting the mobile communication network to the Internet, PSTN (Public Switched Telephone Network) and PSDN (Public Switched Data Network), supports protocol conversion between different networks. The gateway (GW) can also be named PDSN (Packet Data Service Node), AGW (Access Gateway) or MGW (Media Gateway). A profile server 108 manages a profile of the mobile communication network. In this mobile communication network, a link between the base station controller 103 and the base transceiver system 102 is connected through an exclusive circuit such as E1/T1.

Figure 2:
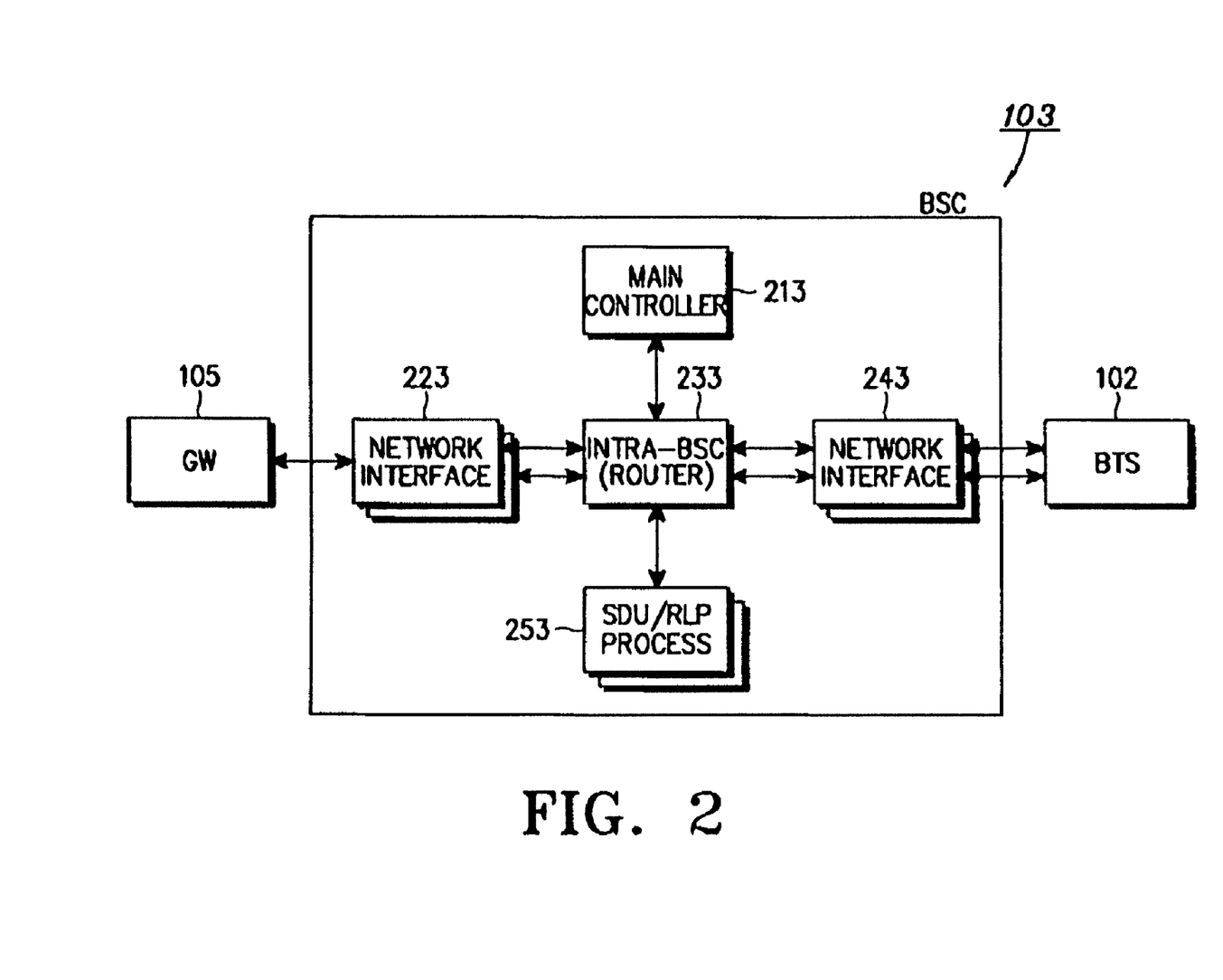
FIG. 2 illustrates a detailed structure of the base station controller (BSC) shown in FIG. 1.
Figure 3:
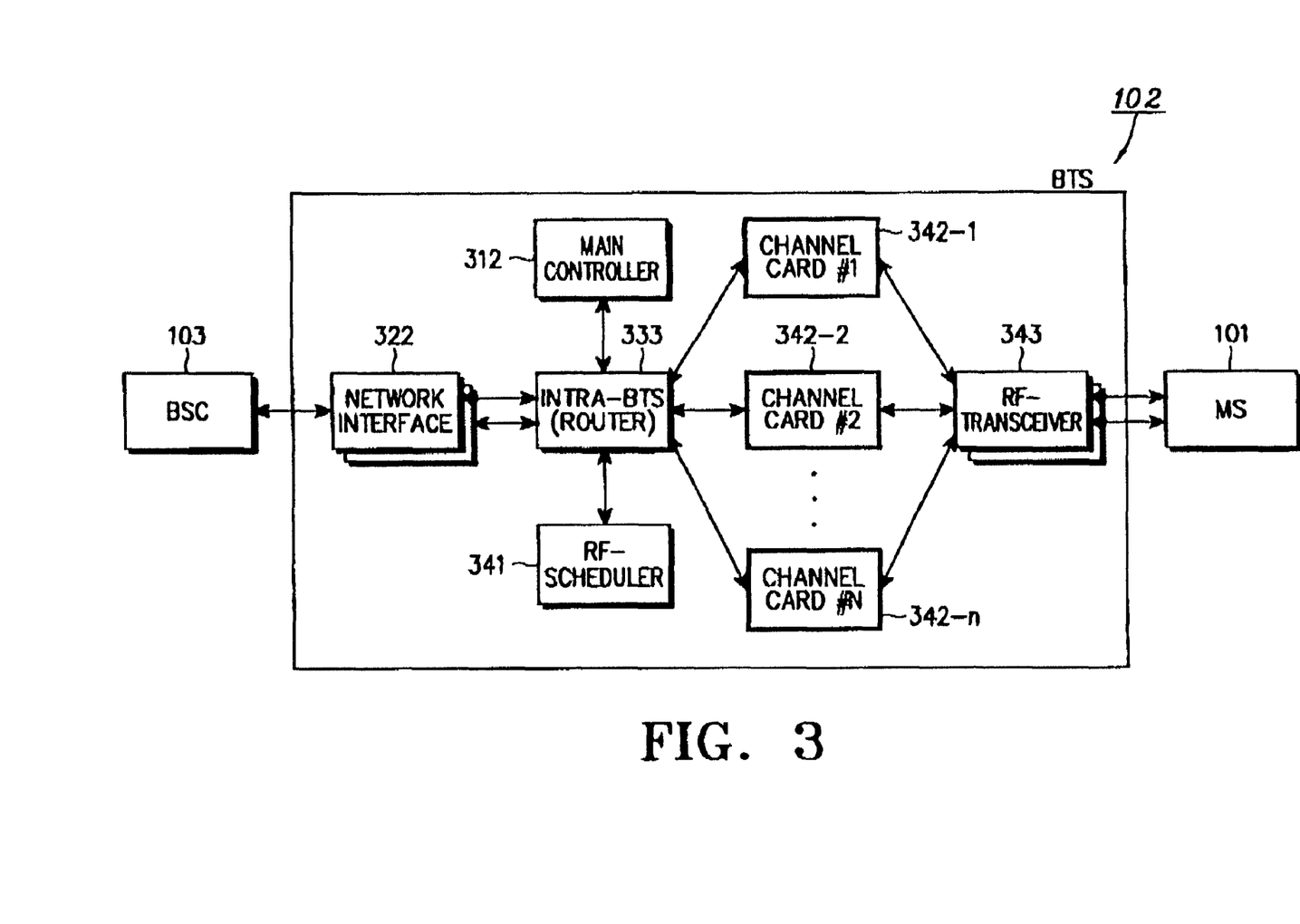
FIG. 3 illustrates a detailed structure of the base transceiver system (BTS) shown in FIG. 1.

FIG. 2 illustrates a detailed structure of the base station controller (BSC) 103 shown in FIG. 1. Referring to FIG. 2, the base station controller 103 includes a main controller 213, a first line interface (or network interface) 223, an intra-BSC switch (or router) 233, a SDU/RLP (Selection and Distribution Unit/Radio Link Protocol) processor 253, and a second line interface (or network interface) 243. The main controller 213 manages the resources of the BSC 103 and a part of the resources of the BTS 102, and controls the overall operation of the base station controller 103. The first line interface 223 interfaces signals between the gateway 105 and the base station controller 103. The intra-BSC switch 233 serves to route and switch traffic in the base station controller 103. The second line interface 243 interfaces signals between the base station controller 103 and the base transceiver system 102. Here, for the first and second line interfaces 223 and 243, a network interface card (NIC) or a line interface card (LIC) is used to connect the gateway 105 to the base transceiver system 102. The SDU/RLP processor 253 exchanges traffic with the mobile station 101. Here, the SDU transmits the traffic to a plurality of base transceiver systems, and combines the same MS data received from the plurality of base transceiver systems. The SDU can also be disposed in the gateway 105. However, it will be assumed herein that the SDU is included in the base station controller 103. The RLP converts the packet traffic received from the gateway 105 to an error controlled protocol frame and provides the converted frame to the base transceiver system 102. FIG. 3 illustrates a detailed structure of the base transceiver system (BTS) 102 shown in FIG. 1. Herein, the base transceiver system will be assumed to be the base transceiver system 102-A of FIG. 1. However, another base transceiver system 102-B also has the same structure.

Referring to FIG. 3, the base transceiver system 102 includes a main controller 312, a line interface (or network interface) 322, an intra-BTS switch (or router) 333, channel cards 342-1 to 342-$n$, an RF (Radio Frequency) transceiver 343, and an RF scheduler 341. The main controller 312 manages resources of the base transceiver system 102, and controls the overall operation of the base transceiver system 102. The line interface 322 serves to interface signals between the base station controller 103 and the base transceiver system 102. The intra-BTS switch 333 routes and switches the traffic in the base transceiver system 102. The RF scheduler 341 can be realized either by a separate board or as a part of a channel card. The channel cards 342 encode and spread the data transmitted to the mobile station 101 in association with the SDU/RLP processor 253 in the base station controller 103. Inversely, the channel cards 342 despread and decode the signals received from the mobile station 101. The RF transceiver 343 performs frequency up-conversion on the signals from the channel cards 342, and transmits the up-converted signals to the mobile station 101. Inversely, the RF transceiver 343 performs frequency down-conversion on the signals received from the mobile station 101 and transmits the down-converted signals to associated channel cards 342.

The main issue in the present invention is communication between the SDU/RLP processor 253 in the base station controller 103 and the channel cards 432 in the base transceiver system 102. The present invention is to implement multiple links so that each user can use multiple transmission links for the communication between the SDU/RLP processor 253 and the channel cards 342.

Figure 4:
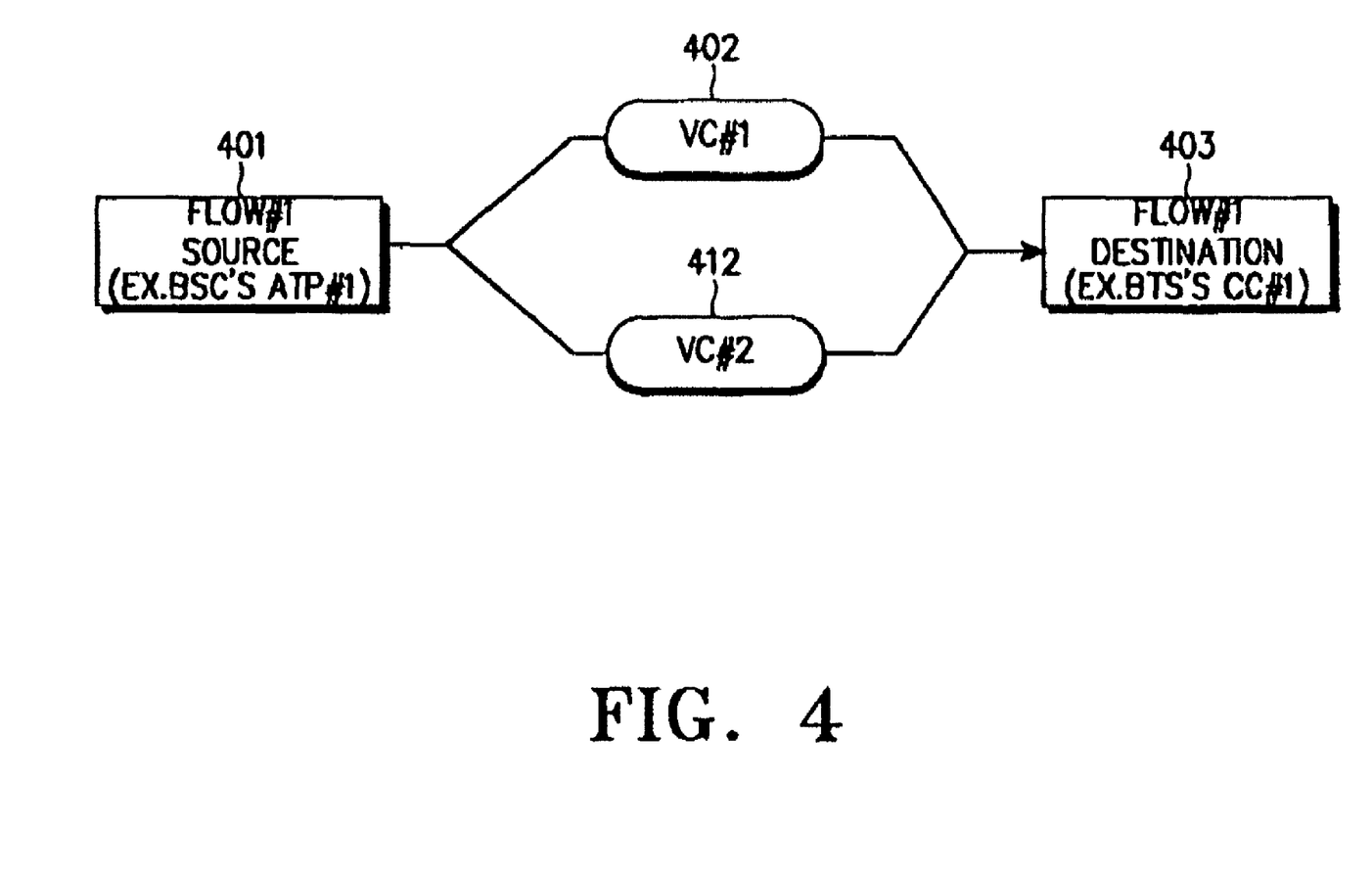
FIG. 4 illustrates a concept of an apparatus for multiplexing multiple end-to-end transmission links according to an embodiment of the present invention.

This concept is illustrated in FIG. 4. As illustrated, there are two connections VC#1 (402) and VC#2 (412) between a source (or transmitter) 401 and a destination (or receiver) 403. That is, two virtual circuits (VCs) are allocated for one service. Here, the respective virtual circuits are assigned to different E1/T1 links.

Figure 5:
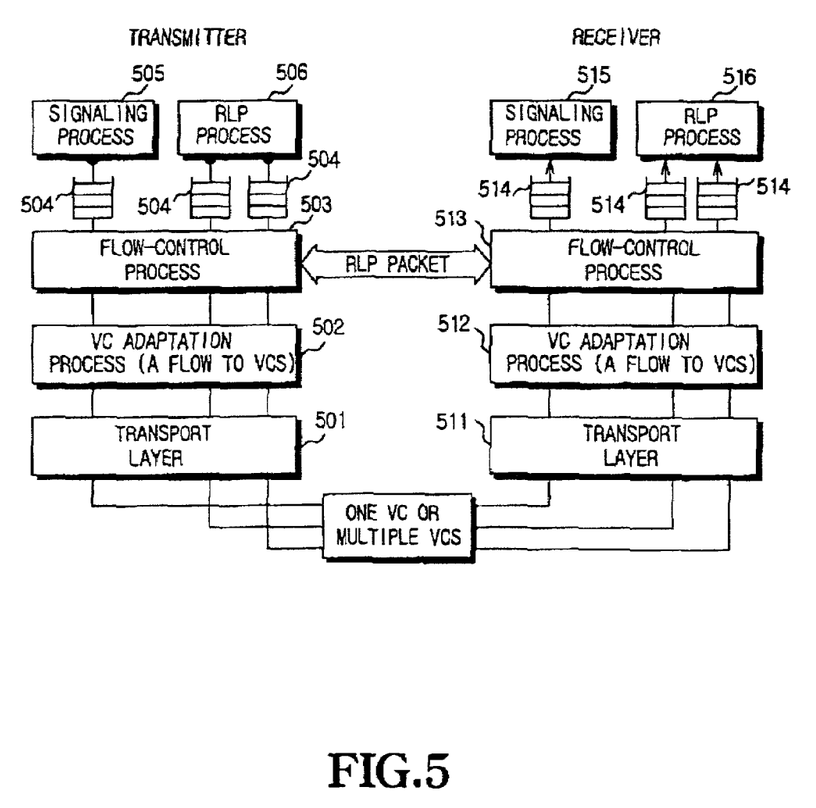
FIG. 5 illustrates a configuration of a protocol layer according to an embodiment of the present invention.

FIG. 5 illustrates a configuration of a protocol layer according to an embodiment of the present invention, in which a transmitter is assumed to be a base station controller while a receiver is assumed to be a base transceiver system. As illustrated, VC adaptation processes 502 and 512 for performing transmission/reception control on a plurality of virtual circuits according to the present invention are implemented under RLP packet flow-control processes 503 and 513. In addition, a connection between the transmitter and the receiver is made by one or a plurality of virtual circuits according to a bandwidth required by the service. Here, the protocol layer has illustrated the base station controller and the base transceiver system by software blocks. Since the transmitter is identical in structure to the receiver, the description will be made as to the receiver only, for simplicity.

Describing the receiver of FIG. 5, the protocol layer includes a transport layer 511, a VC adaptation process 512, a flow-control process 513, a plurality of buffers 514, a signaling process 515 and an RLP process 516. The transport layer 511 transmits and receives packets through a plurality of links, under the control of its upper layer of the VC adaptation process 512. For example, the transport layer 511 is assumed to perform ATM communication. That is, the transport layer 511 transmits and receives packets for the same service through a plurality of VCs. The VC adaptation process 512 performs transmission/reception control on a plurality of VCs according to the present invention. More specifically, the VC adaptation process 512 analyzes a sequence number of a received packet provided from the transport layer 511 to determine whether the received packet is a packet to be received next (hereinafter, referred to as a "to-be-received packet" for short). If the received packet is a to-be-received packet, the VC adaptation process 512 sends the received packet to its upper layer of the control-flow process 513. Otherwise, the VC adaptation process 512 buffers the received packet and then activates a timer. Thereafter, upon receiving the to-be-received packet before expiration of the timer, the VC adaptation process 512 sends the received to-be-received packet to the flow-control process 513 along with the buffered packet. Upon failure to receive the to-be-received packet, the VC adaptation process 512 sends only the buffered packet to the flow-control process 513. During packet transmission, the VC adaptation process 512 selects a link to be used for the packet transmission, from the plurality of links. A detailed operation of the VC adaptation process 512 will be made with reference to FIG. 7 (transmission operation) and FIG. 8 (reception operation). The flow-control process 513 controls the flow of RLP packets. That is, the flow-control process 513 processes the RLP packets provided from its lower layer, and then stores the RLP packets in associated buffers according to their priorities. For example, a signaling message shall be stored in a highest-priority buffer because it has a top priority. The traffic is also stored in associated buffers according to the priorities based on their subscriber or service classes. The signaling process 515 reads a signaling message from the highest-priority buffer and processes the read message. The RLP process 516 reads RLP packets from the other buffers and processes the read packets.

Figure 6:
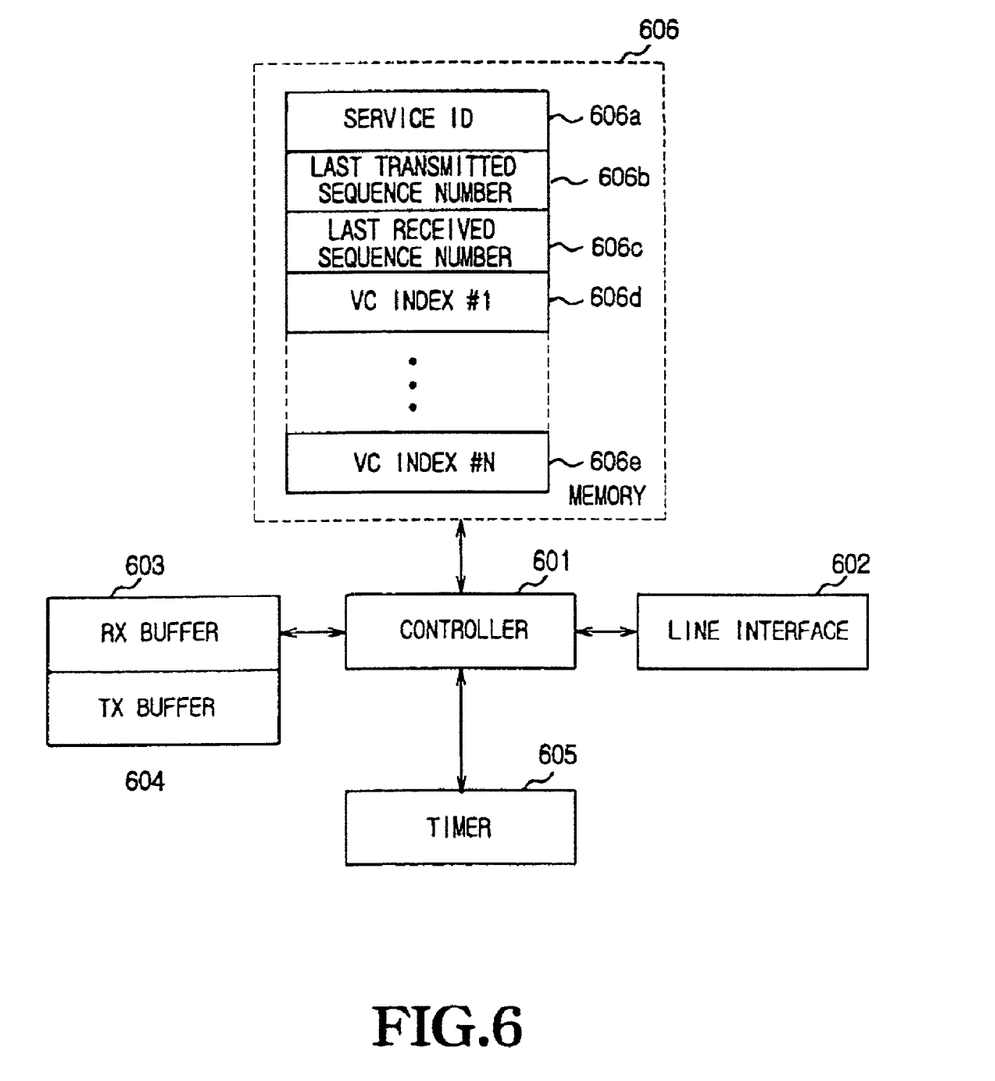
FIG. 6 illustrates an apparatus for multiplexing multiple end-to-end transmission links according to an embodiment of the present invention.

FIG. 6 illustrates an apparatus for multiplexing multiple end-to-end transmission links according to an embodiment of the present invention. A packet transmission control operation by the apparatus is performed when it exchanges data with the base transceiver system 102 through the line interface 243 shown in FIG. 2. In addition, the packet transmission control operation is also performed when the apparatus exchanges data with the base station controller 103 through the line interface 322 shown in FIG. 3. The apparatus for multiplexing multiple end-to-end transmission links according to the present invention is realized in the SDU/RLP processor 253 of the base station controller 103 and the channel cards 342 of the base transceiver system 102, and the apparatus corresponds to the VC adaptation process 502 in the protocol layer configuration of FIG. 5.

Referring to FIG. 6, the apparatus for multiplexing multiple end-to-end transmission links according to the present invention includes a controller 601, a line interface 602, a reception buffer 603, a transmission buffer 604, a timer 605 and a memory 606. The line interface 602 is identical in structure to the line interfaces 243 and 322 shown in FIGS. 2 and 3. The memory 606 includes a plurality of registers. A first register 606a registers a service ID (or service flow). Further, a second register 606b registers the last transmitted packet's sequence number, while a third register 606c registers the last received packet's sequence number. The other registers 606d to 606e register information on virtual circuits of the ATM or other transmission schemes, allocated for the associated services. The reception buffer 603 temporarily stores received packets before transmitting them to its upper layer (e.g., the flow-control process), while the transmission buffer 604 temporarily stores transmission packets. The timer 605 counts a time under the control of the controller 601.

When there is data to be transmitted, the controller 601 determines whether the associated service uses one virtual circuit or a plurality of virtual circuits, by accessing the memory 606. If the service uses one virtual circuit, the controller 601 transmits the packet through the associated link of the line interface 602. If, however, the service uses a plurality of virtual circuits, the controller 601 transmits the packet through the plurality of links in the line interface 602 according to a load-balancing rule. In this process, the controller 601 registers the last transmitted packet's sequence number in the second register 606b of the memory 606.

During packet reception, the controller 601 analyzes a sequence number of a received packet to determine whether it is a normal sequence number. That is, the controller 601 determines whether the received packet has the next sequence number of the last received packet's sequence number stored in the third register 606c. If the sequence number is normal, the controller 601 transmits the received packet to the upper layer, and otherwise, stores the received packet in the reception buffer 603. Further, the controller 601 activates the timer 605 for a preset time, and then awaits reception of the normal packet for the preset time. If the normal packet is received within the preset time, the controller 601 sends the received packet to the upper layer along with the packet stored in the reception buffer 603. Otherwise, the controller 601 abandons received packet in the present time and then transmits the packet stored in the reception buffer 603 to the upper layer.

An operation of the apparatus according to the present invention will be made with reference to the accompanying drawings.

Figure 7:
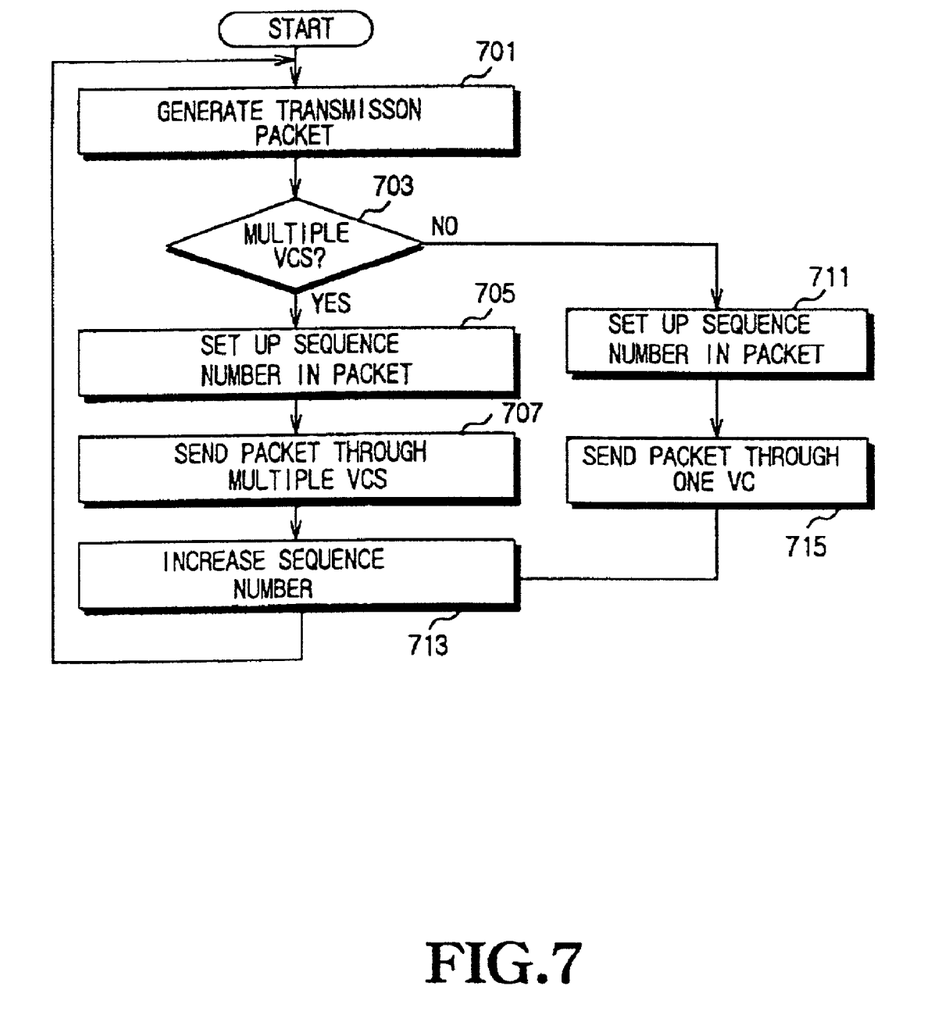
FIG. 7 illustrates a procedure for transmitting packets by a transmitter according to an embodiment of the present invention.

FIG. 7 illustrates a procedure for transmitting packets by a transmitter according to an embodiment of the present invention. Referring to FIG. 7, the controller 601 determines in step 701 whether there is a packet to be transmitted. If there is a packet to be transmitted, the controller 601 proceeds to step 703. In step 703, the controller 601 determines whether an associated service uses a single virtual circuit or a plurality of virtual circuits, by accessing the memory 606. If the service uses a plurality of virtual circuits, the controller 601 proceeds to step 705. Otherwise, if the service uses a single virtual circuit, the controller 601 proceeds to step 711.

If the service uses a plurality of virtual circuits, the controller 601 sets up a sequence number in the transmission packet in step 705. That is, the controller 601 reads the last transmitted packet's sequence number by accessing the memory 606 and registers a next sequence number of the read sequence number in a header of the packet. In step 707, the controller 601 transmits the packets of the same service through a plurality of links according to a load-balancing rule. For example, if a previous packet has been transmitted through a first link on a round robin basis, a next packet will be transmitted through a second link and then a packet after the next packet will be transmitted through the first link. In step 715, the controller 601 increases the sequence number and then returns to step 701 to repeat the succeeding steps.

If the service uses a single virtual circuit (or link), the controller 601 sets up a sequence number in the transmission packet in step 711, and transmits the packet through the single virtual circuit in step 713. After transmitting the packet, the controller 601 increases the sequence number in step 715, and then returns to step 701 to repeat the succeeding steps. Here, the sequence number of the transmitted packet is stored in the memory 606 as the last sequence number.

Figure 8:
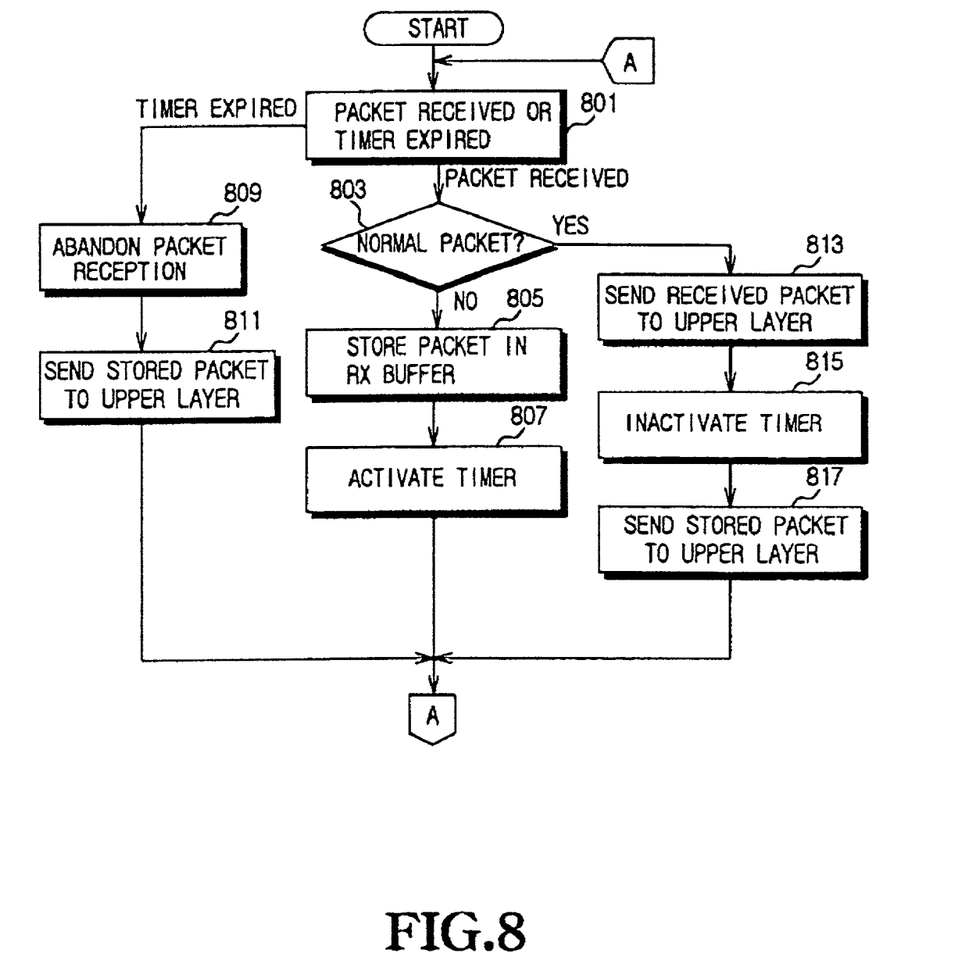
FIG. 8 illustrates a procedure for receiving packets by a receiver according to an embodiment of the present invention.

FIG. 8 illustrates a procedure for receiving packets by a receiver according to an embodiment of the present invention. Referring to FIG. 8, the controller 601 determines in step 801 whether a packet is received or whether a preset timer has expired. Upon receiving a packet, the controller 601 analyzes a sequence number of the received packet in step 803, to determine whether the received packet is normal using a sequence number. That is, the controller 601 determines whether a next packet of the last received packet is received. If the sequence number of the received packet is normal, the controller 601 proceeds to step 813, and otherwise, proceeds to step 805.

If the received packet is abnormal, the controller 601 stores the received packet in the reception buffer 603 in step 805, activates the timer 605 for a preset time in step 807 in order to receive a packet having a sequence number smaller than that of the received packet, and then returns to step 801 to await arrival of a packet. Upon failure to receive a packet until the timer expires, the controller 601 abandons reception of the packet in step 809, and sends the packet stored in the reception buffer 603 to the upper layer (e.g., flow-control process) in step 811.

If it is determined in step 803 that the received packet is normal, the controller 601 sends the received normal packet to the upper layer in step 813. Thereafter, the controller 601 inactivates the activated timer in step 815, and then sends to the upper layer the received packet stored in the reception buffer 603 in step 817.

As described above, the mobile communication system according to the present invention can support a data service at a higher rate compared with the E1/T1 links, by multiplexing multiple end-to-end transmission links between the base station controller and the base transceiver system. That is, it is possible to support a high-speed data service by using a plurality of transmission links like a single logical link for a specific service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a packet through a plurality of links in a mobile communication system in which a base station controller (BSC) is connected to a base transceiver system (BTS) through the plurality of links, comprising the steps of:

determining whether a specific service uses at least two links, when there is transmission data for the service;

setting up a sequence number in the transmission packet, when the service uses at least two links;

transmitting the packet through a selected link among the at least two links;

increasing the sequence number after transmitting the packet;

registering a next sequence number in a header of the packet for transmission of the packet through a selected link allocated for the service; and transmitting a next packet through a second link and transmitting a packet after the next packet through the first link.

2. The method as claimed in claim 1, further comprising the step of setting up a sequence number in the transmission packet and transmitting the packet through a link when the service uses one link.

3. The method as claimed in claim 1, wherein the link selection method is a round robin basis.

4. The method as claimed in claim 1, wherein the plurality of the links include E1/T1 links and use an ATM (Asynchronous Transfer Mode) scheme in which each link is assigned one virtual circuit.

5. A method for receiving a packet through a plurality of links in a mobile communication system in which a base station controller (BSC) is connected to a base transceiver system (BTS) through the plurality of links, comprising the steps of:

determining whether a packet is received through a selected link among the plurality of links;

determining whether the received packet is a to-be-received packet by analyzing a sequence number of the received packet;

sending the received packet to an upper layer, if the received packet is a to-be-received packet, wherein the packet is for a specific service using at least two links, and the selected link is the link among the at least two links;

registering a next sequence number in a header of the packet for transmission of the packet through a selected link allocated for the service; and transmitting a next packet through a second link and transmitting a packet after the next packet through the first link.

6. The method as claimed in claim 5, further comprising the steps of:

storing the received packet in a reception buffer and activating a timer, when the received packet is not a to-be-received packet; and upon receiving the to-be-received packet before expiration of the timer, inactivating the timer and processing the received to-be-received packet along with the stored packet in the reception buffer.

7. The method as claimed in claim 6, further comprising the step of:

abandoning the to-be-received packet and processing the stored packet in the reception buffer, upon failure to receive the to-be-received packet before expiration of the timer.

8. The method as claimed in claim 5, wherein the plurality of links include E1/T1 links and use an ATM scheme in which each link is assigned one virtual circuit.

9. An apparatus for transmitting a packet through a plurality of links in a mobile communication system in which a base station controller (BSC) is connected to a base transceiver system (BTS) through the plurality of links, comprising:

a memory for storing a last transmitted sequence number and ID of links allocated for a specific service among the plurality of links in association with the service;

a transmission buffer for temporarily storing a transmission packet; and a controller for setting up a sequence number in the transmission packet based on the last transmitted sequence number, for transmitting the packet through a selected link among the links allocated for the service and for increasing the sequence number after transmitting the packet, wherein a next sequence number is registered in a header of the packet for transmission of the packet through a selected link allocated for the service; and a next packet is transmitted through a second link and a packet is transmitted after the next packet through a first link.

10. The apparatus as claimed in claim 9, wherein the link selection method is selected on a round robin basis.

11. The apparatus as claimed in claim 9, wherein the plurality of links include E1/T1 links and use an ATM scheme in which each link is assigned one virtual circuit.

12. An apparatus for receiving a packet through a plurality of links in a mobile communication system in which a base station controller (BSC) is connected to a base transceiver system (BTS) through a plurality of links, comprising:

a memory for storing a last received sequence number and ID of links allocated for a specific service among the plurality of links in association with the service;

a reception buffer for temporarily storing the received packet; and a controller for determining whether a received packet received through the allocated links is a to-be-received packet by accessing the last received sequence number, and processing the received packet if the packet is a to-be-received packet, wherein a next sequence number is registered in a header of the packet for transmission of the packet through a selected link allocated for the service; and a next packet is transmitted through a second link and a packet is transmitted after the next packet through a first link.

13. The apparatus as claimed in claim 12, further comprising a timer for counting a time under the control of the controller in order to process packets other than the to-be-received packet.

14. The apparatus as claimed in claim 13, wherein the controller stores the received packet in the reception buffer and activates a timer if the received packet is not the to-be-received packet, and wherein upon receiving the to-be-received packet before expiration of the timer, the controller inactivates the timer and processes the to-be-received packet along with the stored packet in the reception buffer.

15. The apparatus as claimed in claim 13, wherein the controller stores the received packet in the reception buffer and activates a timer if the received packet is not the to-be-received packet, and wherein upon failure to receive the to-be-received packet before expiration of the timer, the controller abandons reception of the to-be-received packet and processes the stored packet in the reception buffer.

16. The apparatus as claimed in claim 12, wherein the plurality of links include E1/T1 lines and use an ATM scheme in which each link is assigned one virtual circuit.

17. A protocol performing apparatus for transmitting a packet through a plurality of links in a mobile communication system in which a base station controller (BSC) is connected to a base transceiver system (BTS) through the plurality of links, comprising:

a virtual circuit (VC) adaptation process for setting up a sequence number in a transmission packet based on a last transmitted sequence number upon receiving the transmission packet from an upper layer, for selecting a link for transmitting the packet among the plurality of links, for sending the packet with the sequence number and ID of the selected link to a transport layer and for increasing the sequence number after transmitting the packet; and the transport layer for transmitting the packet provided from the VC adaptation process through the selected link among the plurality of links, wherein a next sequence number is registered in a header of the packet for transmission of the packet through a selected link allocated for the service; and a next packet is transmitted through a second link and a packet is transmitted after the next packet through a first link.

18. The protocol performing apparatus as claimed in claim 17, wherein the VC adaptation process selects the link used for packet transmission on a round robin basis.

19. The protocol performing apparatus as claimed in claim 17, wherein the plurality of links include E1/T1 links and use an ATM scheme in which each link is assigned one virtual circuit.

20. A protocol performing apparatus for receiving a packet through a plurality of links in a mobile communication system in which a base station controller (BSC) is connected to a base transceiver system (BTS) through the plurality of links, comprising:

a transport layer for receiving a packet through the plurality of links and sending the received packet to a VC adaptation process; and the VC adaptation process for analyzing a sequence number of the packet received from the transport layer to determine whether the received packet is a to-be-received packet, and sending the received packet to an upper layer to process the received packet, if the received packet is the to-be-received packet, wherein a next sequence number is registered in a header of the packet for transmission of the packet through a selected link allocated for the service; and a next packet is transmitted through a second link and a packet is transmitted after the next packet through a first link.

21. The protocol performing apparatus as claimed in claim 20, wherein the VC adaptation process buffers the received packet and activates a timer if the received packet is not a to-be-received packet, wherein upon receiving the to-be-received packet before expiration of the timer, the VC adaptation process sends the to-be-received packet to the upper layer along with the buffered packet.

22. The protocol performing apparatus as claimed in claim 20, wherein the VC adaptation process buffers the received packet and activates a timer if the received packet is not a to-be-received packet, wherein upon failure to receive the to-be-received packet before expiration of the timer, the VC adaptation process abandons reception of the to-be-received packet and sends the buffered packet to the upper layer.

23. The protocol performing apparatus as claimed in claim 20, wherein the plurality of links include E1/T1 links and use an ATM scheme in which each link is assigned one virtual circuit.

* * * * *